United States Patent
Noirot et al.

(10) Patent No.: US 9,816,556 B2
(45) Date of Patent: Nov. 14, 2017

(54) ROLLING BEARING, NOTABLY FOR SHIP'S PROPELLER OR FOR WIND TURBINE

(71) Applicant: Aktiebolaget SKF, Göteborg (SE)

(72) Inventors: Jean-Baptiste Noirot, Avallon (FR); Jean-Baptiste Magny, Mige (FR); Cyril Bouron, Avallon (FR); Pascal Ovize, Chitry le Fort (FR)

(73) Assignee: AKTIEBOLAGET SKF, Gothenburg (SE)

( * ) Notice: Subject to any disclaimer, the term of this patent is extended or adjusted under 35 U.S.C. 154(b) by 562 days.

(21) Appl. No.: 14/060,160

(22) Filed: Oct. 22, 2013

(65) Prior Publication Data

US 2014/0112790 A1   Apr. 24, 2014

(30) Foreign Application Priority Data

Oct. 22, 2012   (FR) ...................... 12 60017

(51) Int. Cl.
*F16C 33/58*   (2006.01)
*F03D 80/70*   (2016.01)
*F16H 55/17*   (2006.01)

(52) U.S. Cl.
CPC ............ *F16C 33/581* (2013.01); *F03D 80/70* (2016.05); *F16H 55/17* (2013.01); *F05B 2240/50* (2013.01); *F05B 2260/79* (2013.01); *F16C 2360/31* (2013.01); *F16H 2055/176* (2013.01); *Y02E 10/721* (2013.01); *Y02E 10/722* (2013.01); *Y10T 74/1993* (2015.01)

(58) Field of Classification Search
CPC ................ F16C 33/581; Y10T 74/1993; F05B 2240/50; F05B 2260/79; F16H 2055/176; F03D 11/0008; F03D 1/003; F03D 7/0224

See application file for complete search history.

(56) References Cited

U.S. PATENT DOCUMENTS

| | | |
|---|---|---|
| 7,331,761 B2 | 2/2008 | Hansen et al. |
| 2011/0142631 A1* | 6/2011 | Kawai ................... F03D 7/0224 416/35 |
| 2012/0009063 A1 | 1/2012 | Noda et al. |
| 2013/0039768 A1* | 2/2013 | Iffland ................... F03D 1/0658 416/155 |

(Continued)

FOREIGN PATENT DOCUMENTS

| | | |
|---|---|---|
| CN | 101326363 A | 12/2008 |
| CN | 201281080 Y | 7/2009 |
| CN | 101518342 A | 9/2009 |

(Continued)

*Primary Examiner* — Gregory Anderson
*Assistant Examiner* — Juan G Flores
(74) *Attorney, Agent, or Firm* — Bryan Peckjian; SKF USA Inc. Patent Department

(57) ABSTRACT

Rolling bearing (1) comprising an inner ring (3), an outer ring (2), at least one row of rolling elements which are arranged between raceways formed on the rings (2, 3) and a ring gear (6) that has a circumference of less than 360° and is fixed to one of the rings (2). The ring gear (6) is formed of a single gear segment (7) which has a circumference substantially equal to the circumference of the ring gear (6) and is provided on its inner or outer peripheral surface with a plurality of meshing means (7b) and fixed only to one of either the inner or outer rings (3) of the rolling bearing (1).

5 Claims, 5 Drawing Sheets

(56) References Cited

U.S. PATENT DOCUMENTS

2014/0308131 A1* 10/2014 Pasquet ................ F03D 7/0224
                                                                  416/155

FOREIGN PATENT DOCUMENTS

| CN | 101725631 A | 6/2010 | | |
|----|----|----|----|----|
| CN | 102523749 A | 6/2012 | | |
| DE | 102010010639 A1 * | 9/2011 | ........... | F03D 1/0658 |
| DK | WO 2013071936 A1 * | 5/2013 | ........... | F03D 7/0224 |
| EP | 2463521 A2 | 6/2012 | | |
| EP | 2474735 A2 | 7/2012 | | |
| WO | 2012072627 A1 | 6/2012 | | |

* cited by examiner

ROLLING BEARING, NOTABLY FOR SHIP'S PROPELLER OR FOR WIND TURBINE

CROSS-REFERENCE TO RELATED APPLICATION

This application claims priority to French Patent Application No. FR1260017 filed on Oct. 22, 2012, the contents of which is fully incorporated herein by reference.

FIELD OF THE INVENTION

The present invention relates to the field of rolling bearings and notably relates to rolling bearings used in the field of ship's propellers or wind turbines.

BACKGROUND OF THE INVENTION

A "ship" means a high-tonnage vessel intended for maritime shipping, such as merchant shipping (oil tankers, container ships, fishing boats, etc.), warships (aircraft carriers, submarines, etc.) or alternatively large sailing boats or cruise liners. A ship's propeller typically takes the form of an assembly comprising an engine which drives the rotation of at least one propeller screw, this propeller being fixed to the hull of the ship, notably at the rear of the ship. In order to steer the ship, it is known practice to use what is known as a "pitch bearing" in order to orientate the propeller with respect to the hull of the ship.

A wind turbine generally comprises a nacelle, mounted for rotation on a mast and enclosing a generator intended to produce electrical energy, a rotor driven by the wind and provided with a hub supporting at least two blades, and a large-sized rolling bearing supporting the rotor.

In order to control the load supplied to the rotor, it is common to use a pitch bearing in order to orientate the blades of the wind turbine about their longitudinal axis according to the wind direction.

Such a rolling bearing comprises an outer ring fixed to the hub, an inner ring fixed to one of the blades and a plurality of rolling elements, such as balls, arranged between the inner and outer rings.

The rolling bearing comprises a ring gear provided with a peripheral inner gear teeth intended to mesh with an actuator via a gearwheel. It is known practice to form the inner gear teeth directly on the inner surface of the inner ring.

However, such a rolling bearing referred to as a pitch bearing works only when it is necessary to orientate the blade or the propeller and performs small rotations, such that only a small portion of the gear teeth is used. In addition, such a rolling bearing may be stationary for lengthy periods of time, thus causing accelerated degradation.

As the gear teeth wears, it then becomes necessary to dismantle the inner ring, or even the rolling bearing in its entirety, which is a relatively complex and expensive operation.

Reference may be made to document EP 2 474 735 which describes a device for mounting a blade pitch gear on a pitch bearing of a wind turbine comprising an inner ring, an outer ring and a gear which is fixed to the inner ring by a plurality of fixing means.

Although such a device allows only the gear to be changed in the event of wear, the plurality of fixing means generates great overall external dimensions and is complicated to achieve.

Reference may also be made to document U.S. Pat. No. 7,331,761 which describes a blade pitch bearing for a wind turbine comprising an inner ring, an outer ring and two rows of rolling elements which are arranged between the rings. The inner surface of the inner ring is provided with a plurality of teeth over a portion less than 200° and intended to mesh with a gear in order to orientate the blades of the wind turbine.

However, as the gear teeth wears, it then becomes necessary to remove the inner ring in its entirety.

It is therefore an object of the present invention to remedy these disadvantages.

More specifically, the present invention seeks to provide a rolling bearing that is easy to manufacture, to fit, is of small overall external dimensions, and allows the meshing means to be removed quickly and economically.

SUMMARY OF THE INVENTION

The invention concerns a rolling bearing comprising an inner ring, an outer ring, at least one row of rolling elements which are arranged between raceways made on the said rings and a ring gear fixed to one of the said rings.

The ring gear is formed of a single gear segment having a circumference which is substantially equal to the circumference of the ring gear and which segment is provided on its inner or outer peripheral surface with a plurality of meshing means and fixed only to one of either the inner or outer rings of the rolling bearing.

Thus, the damaged gear segment can be removed without removing in its entirety the inner or outer ring to which the gear segment is fixed, or even the rolling bearing in its entirety, allowing a simplified disassembly.

Advantageously, the gear segment comprises an axial portion extending axially from a radial surface of the gear segment.

The axial portion may comprise at least one radial drilling designed to cooperate with an attachment means to one of the inner or outer rings.

According to one embodiment, the gear segment comprises a radial portion extending radially from the axial portion in the opposite direction to the meshing means.

The radial portion may comprise at least one axial drilling designed to cooperate with an attachment means to one of the inner or outer rings.

According to one embodiment, the ring gear is fixed to the peripheral inner surface of the inner ring, the said gear segment being provided on its inner peripheral surface with a plurality of meshing means.

The circumference of the ring gear may be less than or equal to 90°. Indeed, when the blade is orientated, the rolling bearing makes small rotations such that only a small portion of the gear teeth is used. Use of a ring gear with a circumference of 90° or less is then sufficient and allows a significant reduction in materials.

Advantageously, the meshing means are radial teeth, for example designed to cooperate with a gearwheel, such as a pinion.

According to a second aspect, the invention relates to a wind turbine comprising a nacelle, mounted on a mast and enclosing a generator intended to produce electrical energy, a rotor provided with a hub supporting at least two blades and a rolling bearing as described hereinabove mounted between the hub and a blade.

BRIEF DESCRIPTION OF THE FIGURES

The present invention will be better understood from reading the description of a number of embodiments which are given by way of non-limiting examples and illustrated by the attached drawings in which.

DETAILED DESCRIPTION OF THE INVENTION

Figure 1:
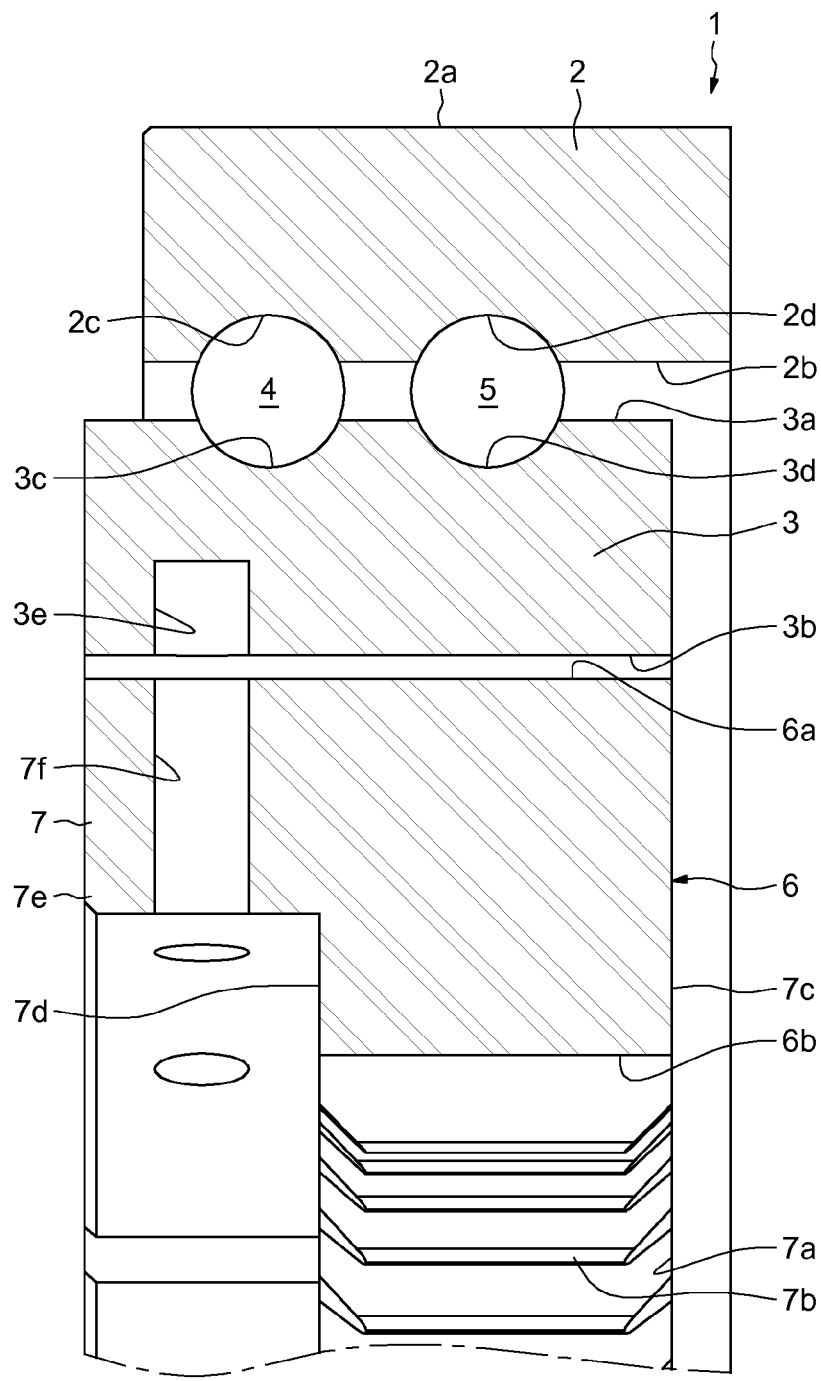
FIG. 1 is a view in axial section of a rolling bearing according to a first embodiment of the invention.
Figure 2:
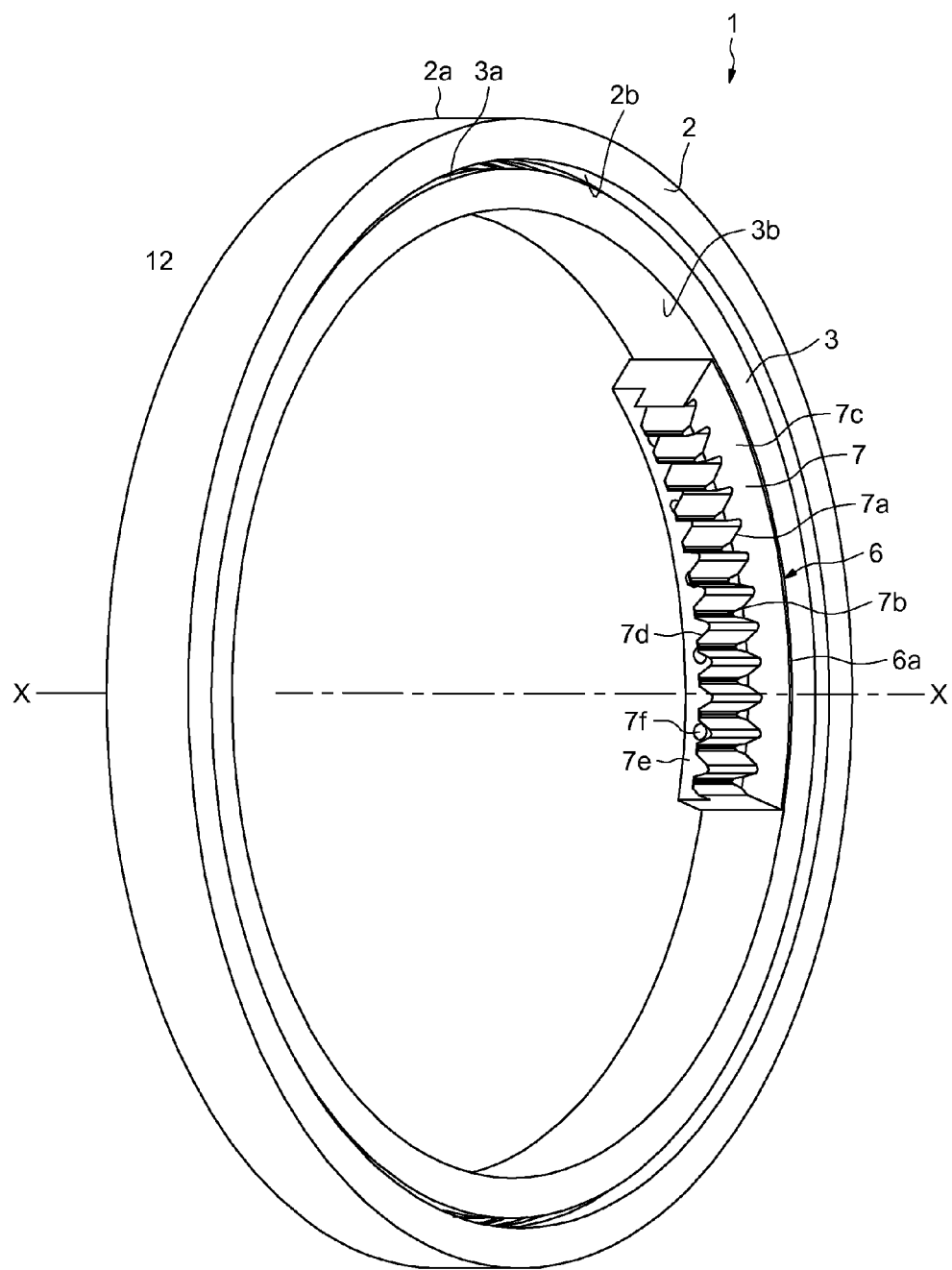
FIG. 2 is a perspective view of the rolling bearing according to FIG. 1.
Figure 3:
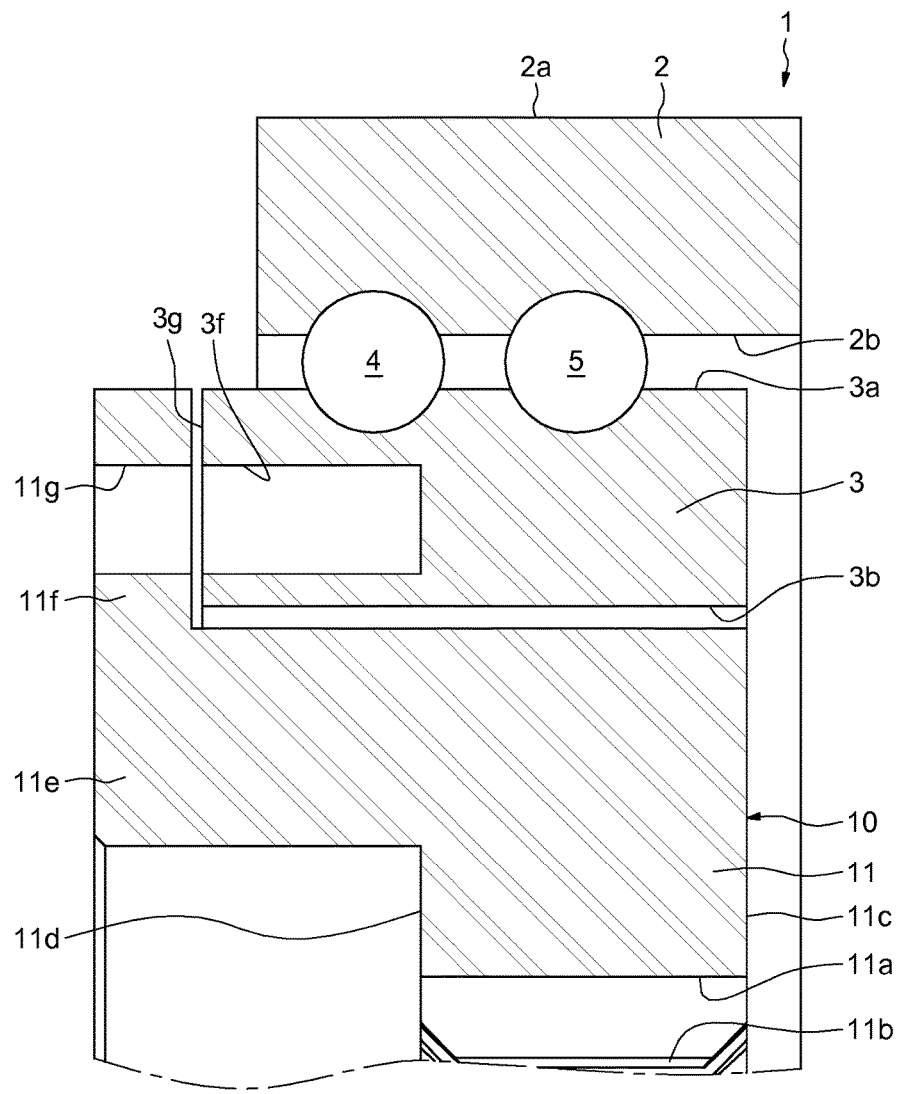
FIG. 3 is a view in axial section of a rolling bearing according to a second embodiment of the invention.

The rolling bearing, of axial axis X-X, referenced 1 in FIGS. 1 to 3, is a rolling bearing known as a pitch bearing intended to be used in a wind turbine (not depicted).

By way of non-limiting example, a wind turbine comprises a nacelle placed at one end of a mast and a rotor provided with a hub supporting at least two blades which are powered by the wind in order to produce electrical energy.

The rolling bearing 1 is designed to be placed between the hub of the rotor and one of the blades and used to orientate the blades of the wind turbine about their longitudinal axis according to the wind direction.

The rolling bearing 1 comprises an outer ring 2 designed to be fixed to the hub (not depicted) by its cylindrical outer surface 2a or by one of its faces, an inner ring 3 intended to be fixed to one of the blades (not depicted), two rows of rolling elements 4, 5, here produced in the form of balls, arranged between the inner 3 and outer 2 rings and a cage (not depicted) for maintaining the circumferential spacing of the rolling elements of each row 4, 5. As an alternative, it is possible to conceive of a single row of rolling elements which are arranged between the inner 3 and outer 2 rings.

The outer 2 and inner 3 rings are solid. What is meant by "solid ring" is a ring the shape of which is obtained by machining with the removal of chips (turning, grinding) from tubes, bar stock, forged and/or rolled blanks.

The outer ring 2 comprises, at its bore 2b, two deep-groove raceways 2c, 2d which in cross section have a concave internal profile suited to the rolling elements 4, 5; the said raceways 2c, 2d facing radially inwards. The inner ring 3 also comprises, at its cylindrical outer surface 3a, two deep-groove raceways 3c, 3d which in cross section have a concave internal profile suited to the rolling elements 4, 5, the said raceways 3c, 3d being directed radially outwards. The raceway 2c of the outer ring 2 is aligned with the raceway 3c of the inner ring 3 so as to accommodate the rolling elements of the first row 4 of rolling elements. The raceway 2d of the outer ring 2 is aligned with the raceway 3d of the inner ring 3 so as to accommodate the rolling elements of the second row 5 of rolling elements.

In another preferred embodiment of the invention (which has not been depicted), each raceway 2c, 2d, 3c, 3d comprises two tracks for the rolling elements, these two tracks having the same radius but different centres so that each row of rolling elements adopts what is known as the "four-point contact" configuration.

The rolling bearing 1 comprises a ring gear 6 of annular shape extending circumferentially over less than 360° and designed to be fixed to one of the inner or outer rings. As illustrated in FIG. 2, the ring gear 6 has a circumference of substantially 60°. As an alternative, it is possible to conceive of a ring gear that has a circumference equal to, for example, 30°, 45°, 90° or even 120°.

In the example illustrated, the outer surface 6a of the ring gear 6 is fixed to the cylindrical inner surface 3b of the inner ring 3. As an alternative, provision can be made for the inner surface 6b of the ring gear 6 to be fixed to the cylindrical outer surface 2a of the outer ring 2. In that case, the inner ring 3 would be fixed to the hub and the outer ring 2 would be fixed to one of the blades.

The ring gear 6 illustrated in details in FIG. 2 is formed by a single gear segment 7 with a circumference of substantially 60°. The single gear segment 7 has a circumference equal to the circumference of the ring gear 6.

As illustrated in FIG. 2, the independent gear segment 7 is provided on its inner peripheral surface 7a with a plurality of radial teeth 7b which are intended to mesh with a gearwheel (not depicted) of complementary shape. As an alternative, any other form of intermesh allowing the gear segment to mesh with the gearwheel could be provided. The gear segment 7 is fixed only to the inner surface 3b of the inner ring 3 of the rolling bearing 1. As an alternative, provision could be made for the gear segment 7 to be fixed only to the outer surface 2a of the outer ring 2 of the rolling bearing 1.

The gear segment 7 comprises two lateral radial surfaces 7c, 7d, an axial portion 7e extending axially from the second lateral radial surface 7d, opposite to the first lateral surface 7c. The outside diameter of the axial portion 7e is substantially identical to the outside diameter of the gear segment 7 and the inside diameter of the axial portion 7e is greater than the diameter of the inner surface 7a of the gear segment 7. As illustrated, the axial portion 7e comprises a plurality of radial drillings 7f each one designed to cooperate with an attachment means (not depicted) cooperating with a corresponding radial drilling 3e made in the inner surface 3b of the inner ring 3. The attachment means may, for example, be screw-fastener means, such as screw-nut systems, or rivets.

Alternatively, these attachment means may be limited to a positioning means, such as centring pegs or a supporting shoulder.

Figure 4:
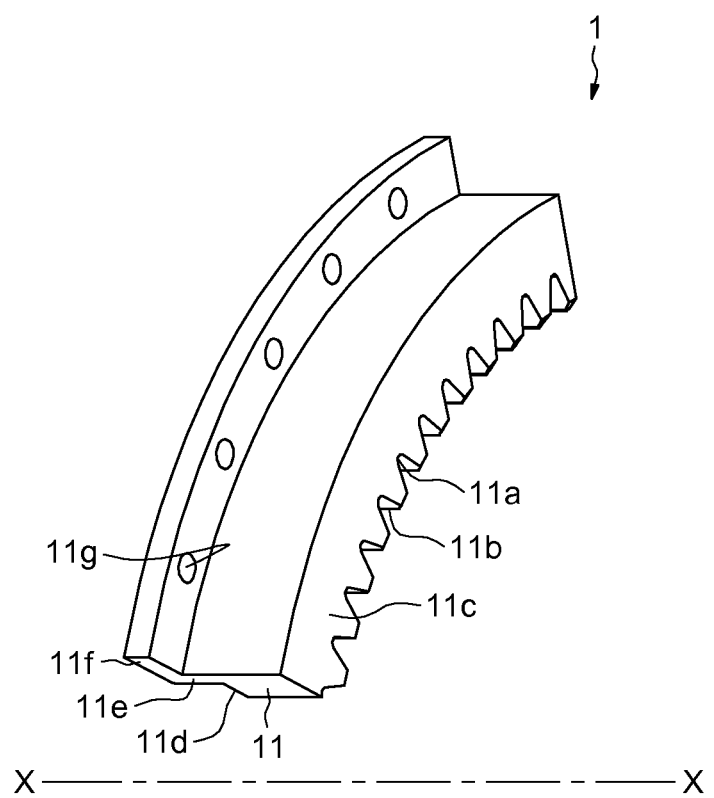
FIG. 4 is a perspective view of the ring gear in the rolling bearing of FIG. 3.
Figure 5:
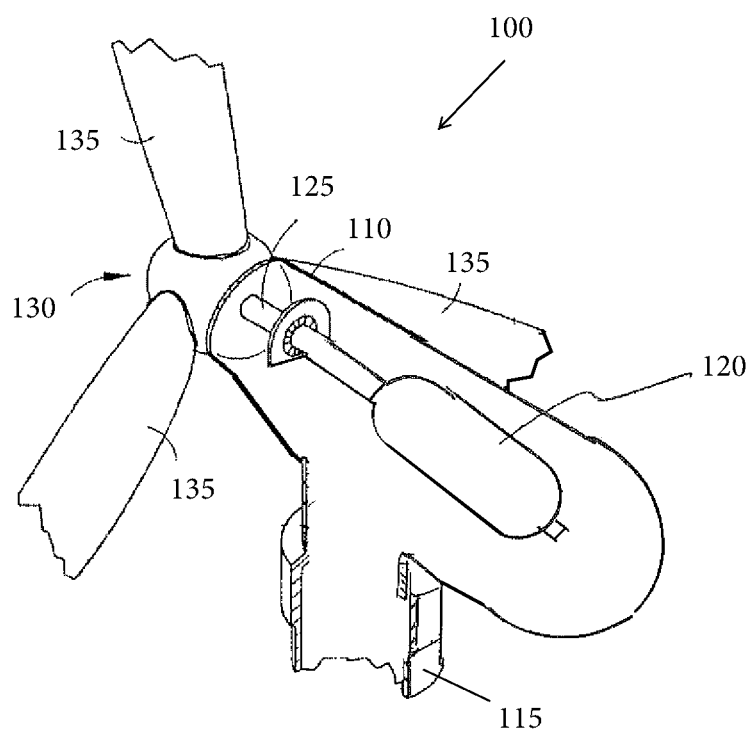
FIG. 5 is a cut away perspective view of a wind turbine according to the present invention.

The embodiment illustrated in FIGS. 3 and 4, in which the same elements have the same references, differs from the embodiment illustrated in FIGS. 1 and 2 in terms of the shape of the gear segment.

As illustrated in FIGS. 3 and 4, the ring gear 10, illustrated in detail in FIG. 4, has a circumference of 45° and is formed of a single gear segment 11, extending circumferentially over substantially 45°. As an alternative, it is possible to provide a ring gear having a circumference equal to, for example, 30°, 60°, 90° or even 120°, while being less than 360°. The single gear segment 11 has a circumference equal to the circumference of the ring gear 10.

The gear segment 11 is fixed only to the inner surface 3b of the inner ring 3 of the rolling bearing 1.

As illustrated in FIGS. 3 and 4, the gear segment 11 is provided on its inner peripheral surface 11a with a plurality of radial teeth 11b intended to mesh with a gearwheel (not depicted) of complementary shape. As an alternative, any other form of intermesh that allows the gear segment to mesh with the gearwheel could be provided.

The gear segment 11 comprises two lateral radial surfaces 11c, 11d and an axial portion 11e extending axially from the second lateral radial surface 11d, opposite to the first lateral surface 11c. The outside diameter of the axial portion 11e is substantially identical to the outside diameter of the gear segment 11 and the inside diameter of the axial portion 11e is greater than the diameter of the inner surface 11a of the gear segment 11. As illustrated, the gear segment 11 comprises a radial portion 11f extending radially from the axial portion 11e in the opposite direction to the radial teeth 11b towards the outer ring 2. The radial portion 11f comprises a plurality of axial drillings 11g intended to collaborate with a means (not depicted) of attachment collaborating with a corresponding axial drilling 3f made in a lateral radial surface 3g of the inner ring 3.

By virtue of the invention, as the gear teeth wears, it is easy to remove the damaged gear segment without fully removing the inner ring, or even the rolling bearing in its entirety.

The special structure of the gear segments allows for ease of attachment to the inner ring, either radially or axially.

It will be noted that the rolling bearing 1 according to the invention could also be used in a high-tonnage ship (not depicted). A ship generally comprises a propeller comprising an engine and at least one propeller screw for propelling the ship. The propeller is mounted on the hull of the ship, notably at the rear of the ship, via the rolling bearing 1. As high-tonnage ships generally have no steering rudder, the rolling bearing 1 allows the propeller to be orientated with respect to the hull of the ship in order to steer the ship.

The invention claimed is:

1. A rolling bearing comprising:
   a first ring having a first raceway, the first ring having a first axial first ring end and a second axial first ring end,
   a second ring having a second raceway, the second ring having a first axial second ring end and a second axial second ring end,
   at least one row of rolling elements disposed between the first raceway and the second raceway, and
   a ring gear having a circumference less than three-hundred sixty degrees (360°), the ring gear being fixed to the first ring and having a ring gear axial length equal to a first ring axial length, the ring gear being completely overlapped by the first ring such that, when viewed in axial cross-section, no portion of the ring gear extends axially past either the first axial first ring end or the second axial first ring end in a direction away from the at least one row of rolling elements, wherein
   the ring gear is formed by a single gear segment having a circumference substantially equal to the circumference of the ring gear and including a plurality of radial teeth disposed on a peripheral surface thereof and fixed to the first ring, the plurality of teeth each having an axial tooth end which is axially aligned with the first axial first ring end of the first ring, the first axial first ring end and the axial tooth end of each of the plurality of radial teeth being axially spaced from both the first axial second ring end and the second axial second ring end, wherein
   the gear segment further comprises an axial portion extending axially from a radial surface of the gear segment, wherein
   the axial portion comprises a first plurality of radial drillings that are each configured to cooperate with a corresponding one of a second plurality of radial drillings in the first ring so that the ring gear can be fixed to the first ring.

2. The rolling bearing according to claim 1, wherein the ring gear is fixed to an inner surface of the first ring, the gear segment being provided on its inner peripheral surface with the plurality of radial teeth.

3. The rolling bearing according to claim 2, wherein the circumference of the ring gear is less than or equal to 90°.

4. The rolling bearing according to claim 3, wherein the circumference of the ring gear is equal to 60°.

5. A wind turbine comprising:
   a nacelle, mounted on a mast and enclosing a generator intended to produce electrical energy,
   a rotor provided with a hub supporting at least two blades, and
   a rolling bearing mounted between the hub and a blade, the rolling bearing providing;
      a first ring having a first raceway, the first ring having a first axial first ring end and a second axial first ring end,
      a second ring having a second raceway, the second ring having a first axial second ring end and a second axial second ring end,
      at least one row of rolling elements disposed between the first raceway and the second raceway, and
      a ring gear having a circumference less than three-hundred sixty degrees (360°), the ring gear being fixed to the first ring and having a first ring gear axial length equal to a first ring axial length, the ring gear being completely overlapped by the first ring such that, when viewed in axial cross-section, no portion of the ring gear extends axially past either the first axial first ring end or the second axial first ring end in a direction away from the at least one row of rolling elements, wherein
   the ring gear is formed by a single gear segment having a circumference substantially equal to the circumference of the ring gear and including a plurality of radial teeth disposed on a peripheral surface thereof and fixed to the first ring, the plurality of teeth each having an axial tooth end which is axially aligned with the first axial first ring end of the first ring, the first axial first ring end and the axial tooth end of each of the plurality of radial teeth being axially spaced from both the first axial second ring end and the second axial second ring end, wherein
   the gear segment further comprises an axial portion extending axially from a radial surface of the gear segment, wherein
   the axial portion comprises a first plurality of radial drillings that are each configured to cooperate with a corresponding one of a second plurality of radial drillings in the first ring so that the ring gear can be fixed to the first ring.

\* \* \* \* \*